: Patent Number: 4,685,727
Date of Patent: Aug. 11, 1987

United States Patent [19]
Cremer et al.

[54] VEHICLE SEAT

[75] Inventors: Heinz P. Cremer, Kaiserslautern; Werner Wittig, Winnweiler; Hans W. Voss, Rockenhausen, all of Fed. Rep. of Germany

[73] Assignee: Keiper Recaro GmbH & Co., Fed. Rep. of Germany

[21] Appl. No.: 844,380

[22] Filed: Mar. 26, 1986

[30] Foreign Application Priority Data

Mar. 28, 1985 [DE] Fed. Rep. of Germany ....... 3511217

[51] Int. Cl.$^4$ ............................................. A47C 7/72
[52] U.S. Cl. ...................................... 297/180; 5/468; 5/469
[58] Field of Search .................... 297/180; 5/453, 455, 5/468, 469, 456

[56] References Cited

U.S. PATENT DOCUMENTS

| 3,136,577 | 1/1964 | Richard | 297/180 |
| 3,681,797 | 8/1972 | Messner | 297/180 X |
| 3,738,702 | 1/1973 | Jacobs | 297/180 |
| 3,822,425 | 7/1974 | Scales | 5/456 |
| 4,006,604 | 2/1977 | Seff | 5/469 X |
| 4,185,341 | 1/1980 | Scales | 5/468 X |

FOREIGN PATENT DOCUMENTS

| 1123220 | 2/1962 | Fed. Rep. of Germany . |
| 7923055 | 11/1979 | Fed. Rep. of Germany . |
| 3423657 | 3/1985 | Fed. Rep. of Germany . |

*Primary Examiner*—James T. McCall
*Attorney, Agent, or Firm*—Wigman & Cohen

[57] ABSTRACT

A vehicle seat has a back rest and support surface for supporting the vehicle user, in which at least one portion of the support surface facing the seat user forms at least the outside of a wall, the inner side of which wall borders at least one channel through which air flows. The wall is at least substantially impermeable to air at the pressure prevailing in the channel and comprises a material which, when there is a drop in the water vapor partial pressure from the outside to the air flowing through the channel, transfers water vapor in the direction of this partial pressure drop.

23 Claims, 6 Drawing Figures

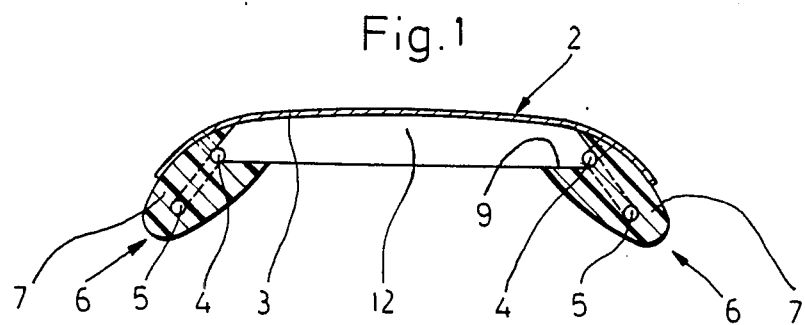
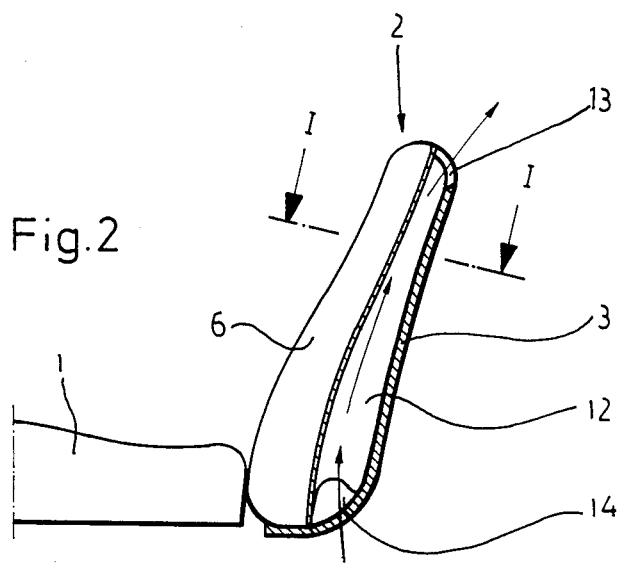
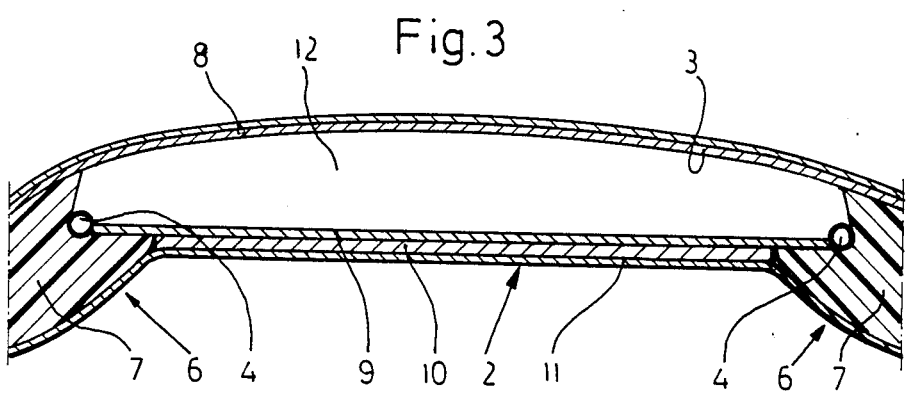

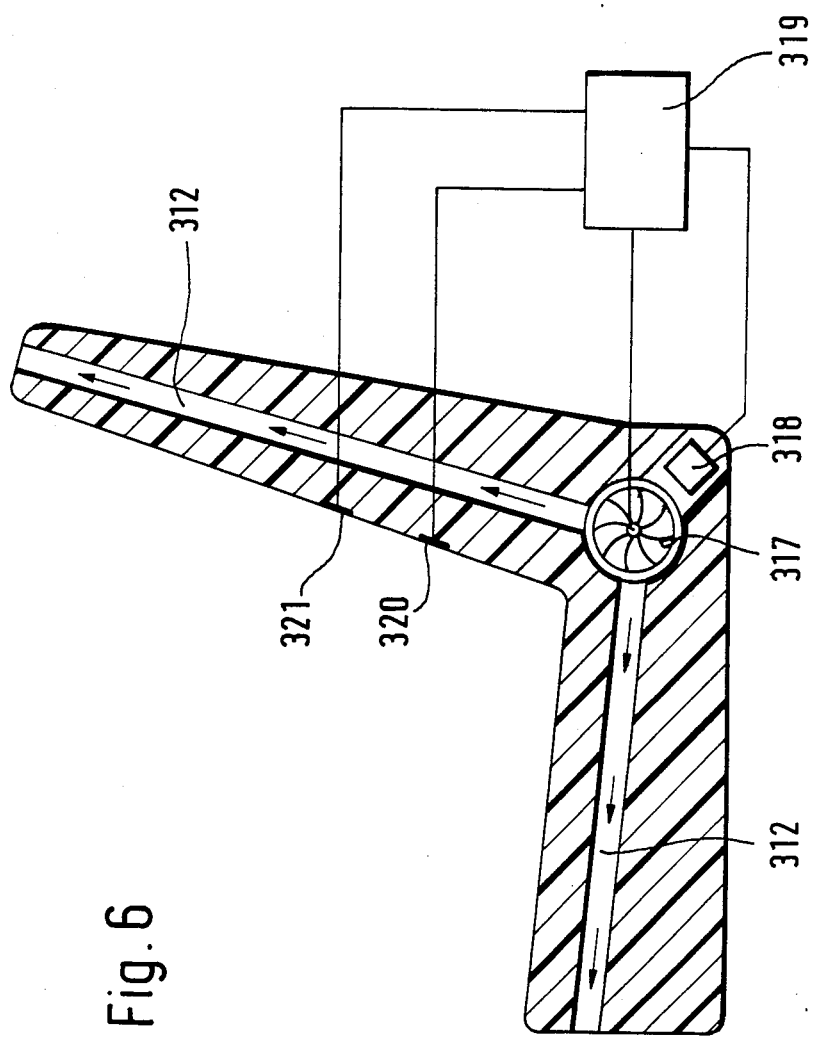

VEHICLE SEAT

BACKGROUND OF THE INVENTION

This invention relates to a vehicle seat, in which at least a portion of the support surface facing the user forms the outside of a wall, the inner side of which defines a channel through which air flows.

In increasing the comfort of vehicle seats it is known to provide seat heating. As a rule, seat heating of this type is provided by one or more heating mats drawing their requisite energy from the vehicle electric system. However, it has also been suggested to provide the seat with channels through which heated air passes, thus heating the inner side of the wall separating the support surface from the channel, in order to produce a heat transfer toward the support surface. Furthermore, to increase comfort in vehicle seats, it is known to introduce air into the seat and to permit it to exit out of the seat against the support surface, in order to achieve a cooling effect. The draft produced in this manner, however, is considered by many people to be uncomfortable and can actually be detrimental to good health. In addition, is the fact that in the areas where the seat user lies directly against the support surface, the air is effectively prevented from discharging from the support surface, so that in these areas there nevertheless results a heat blockage and, consequently, can lead to an increased precipitation of sweat, which can lead to an uncomfortable dampening of the clothes. Climate control devices have therefore proven marketable which lower the temperature of the air in the interior of the motor vehicle. The expense for these climate control devices, however, is significant. In addition, often the air flow necessary because of the required air recirculation is felt to be troublesome.

SUMMARY AND OBJECTS OF THE INVENTION

It is a primary object of the invention to create a vehicle seat which makes increased seat comfort possible even without air conditioning.

Briefly described, the aforementioned object is accomplished according to the invention by providing a vehicle seat having a back rest and a support surface for the vehicle user between which a channel is formed wherein the wall of the support surface facing the user is at least substantially impermeable to air at the pressure prevailing in the channel and comprises a material which, when there is a drop in the water vapor partial pressure from the outside to the air flowing through the channel, transfers water vapor in the direction of this partial pressure drop.

If at least one wall having the characteristics of the invention and having its inner side bordering at least one channel through which air flows is provided at least in those areas of the support surface of a seat where direct contact with the seat user is likely to occur, then the excess water vapor quantity can be transported from the support surface to the channel, where it can be picked up by the air flowing therein and thereby removed. The removal of the excess water vapor quantity prevents a condensation of the water vapor on the surface of the body and in the clothing of the seat user, thereby preventing an unpleasant moistening of the clothing. In addition, the removal of the water vapor assists evaporation cooling, thereby reducing sweat precipitation. Since in the wall design according to the invention no, or at least no discomforting quantity of air penetrates the wall and exits only the support surface, the solution according to the invention also avoids the disadvantages of the known vehicle seats in which a cooling effect is sought by means of the air flowing out of the support surface.

The water vapor transport through the wall which outwardly forms the support surface and inwardly bounds the channel, and the associated heat conductivity to the channel, becomes more and more intense as the water vapor partial pressure in the channel becomes lower relative to that of the skin, i.e., the greater is the negative partial pressure gradient to the channel, and the lower is the resistance to moisture gradient to the channel, and the lower is the resistance to moisture passage. To assure that a negative partial pressure gradient to the channel remains up to relatively high values of the water vapor partial pressure in the air flowing through the channel, the moisture passage resistance of the material is advantageously less than 0.2 $m^2$ mbar/watt. It is preferred that the moisture passage resistance is less than 0.15 $m^2$ mbar/watt. In areas with high air temperatures and high air humidity, i.e., in tropical and subtropical areas, a moisture passage resistance is recommended to be less than 0.05 $m^2$ mbar/watt.

The value which the air permeability of the material forming the wall should not be permitted to exceed depends on the pressure that must prevail in the channel to assure that the requisite air quantity passes through the channel per unit of time. Since it is generally possible to hold the flow resistance of the channel low enough that the pressure drop in the channel does not, or at least does not significantly exceed the order of value of 0.1 mbar, the air permeability of the material forming the wall does not have to be particularly low. Values lying below 20 $l/m^2$ s mbar could be sufficient. It is preferred, however, that the air permeability be less than 10 $l/m^2$ s mbar.

The heat transmission from the support surface toward the channel can be supplemented by a dry heat conduction. A prerequisite for this heat conduction, however, is a negative temperature gradient from the support surface to the air flowing in the channel. Since, with an existing temperature drop toward the channel, the intensity of this heat flow increases as the heat transfer resistance of the wall becomes smaller, one should select the heat transfer resistance of the material forming the wall at less than 0.3 $m^2$ °K./watt, if a supplemental dry heat conductor is desired. Above all, when external conditions are unfavorable, i.e., when the air temperature is relatively high, it is recommended that the value of this heat transfer resistance be selected at even less than 0.1 $m^2$ °K./watt.

A large number of satisfactory materials are available to form the wall, whereby as a rule it would be advantageous to form the wall in separate layers. The layer forming the support surface preferably consists of a textile upholstery covering material consisting of wool, synthetic fibers, or a mixture of wool and synthetic fibers. A wool mat is well suited for the layer immediately adjacent the upholstery material. However, a foam material, particularly an open-pore foam material, which can be connected with the covering material by gluing or lamination, yields good results.

An elastic webbing is advantageous in forming the inner side of the wall bordering the channel, because a substance of this type can simultaneously form a flat upholstery, either alone or in combination with other elements. The thickness of the wall can then be kept very thin, which is advantageous in that the intensity of the moisture and heat transfer increases as the wall thickness decreases. Favorable conditions can also be achieved, however, if the wall is supported on one or more spacing elements lying in the channel. If, in addition to the wall and its perhaps elastically yielding support, another upholstery element is present, then it is advantageous for the above-mentioned reasons to arrange the channel or the channels not in the interior of this upholstery, but rather between this upholstery and the support surface.

The webbing bordering the wall on the channel side can be connected along one portion of its edge with an upholstery support to form an anatomically proper shape. Furthermore, for an anatomically proper support the webbing can have different tensions in different zones. In addition, locally denser webbing style and/or thicker fibers can be advantageous. The webbing can also contain heating wires. By increasing the temperature of the air flowing through the channel with the aid of a heating device, a condensation of the water vapor can be prevented. On the other hand, since the dry heat conduction is limited or even entirely eliminated by an increase in air temperature, it is advantageous to control or regulate the air temperature. Furthermore, it is particularly advantageous to control or regulate the air flow rate through the channel, because the air flow rate influences the water vapor partial pressure of the air in the channel. By controlling or regulating the air quantity flowing through the channel, therefore, one can also influence, naturally within limits, the moisture transfer through the wall into the channel. If the moisture and heat transfer through the wall are to be regulated, then a moisture sensor and/or a temperature sensor would be required. A sensor of this type would advantageously be arranged in the support surface or as close as possible thereto within the wall.

In order to achieve the requisite air flow in the channel or channels, a blower fan is generally sufficient which can be integrated into the seat and, particularly, can be built into the channel. An undesired air flow outside of the channels can be prevented by incorporating the channels into a circulatory system. It will be sufficient in most cases, however, to arrange the entrance and discharge openings of the channels in such a manner that neither the entering nor the discharging air flow impinges on the seat user. This can be accomplished, for example, by directing these openings toward the side. It is also possible to incorporate the channel ventilation into the ventilation system of the vehicle. If this is done, an unwanted air flow in the channel can be avoided with the use of regulating or sealing damper valves or flaps. When the air temperature is low, the use of valves of this type can also avoid a cooling of the seat by means of an unwanted air circulation. Furthermore, by building items into the channel or by varying the shape of the boundary surface of the channel on the side facing the support surface, areas having different moisture removal and cooling effects can be realized.

With the foregoing and other objects, advantages and features of the invention that will become hereinafter apparent, the nature of the invention may be more clearly understood by reference to the following detailed description of the invention, the appended claims and to the several views illustrated in the attached drawings, wherein:

BRIEF DESCRIPTION OF THE DRAWINGS

FIG. 1 is a section through the back rest of the first exemplary embodiment, according to the line I—I in FIG. 2;

FIG. 2 is a longitudinal section of the back rest according to FIG. 1, and a partially illustrated side view of the associated seat element;

FIG. 3 is an enlarged portion from FIG. 1;

FIG. 6 is a schematic section of a fourth exemplary embodiment.

DETAILED DESCRIPTION OF A PREFERRED EMBODIMENT

Figure 4:
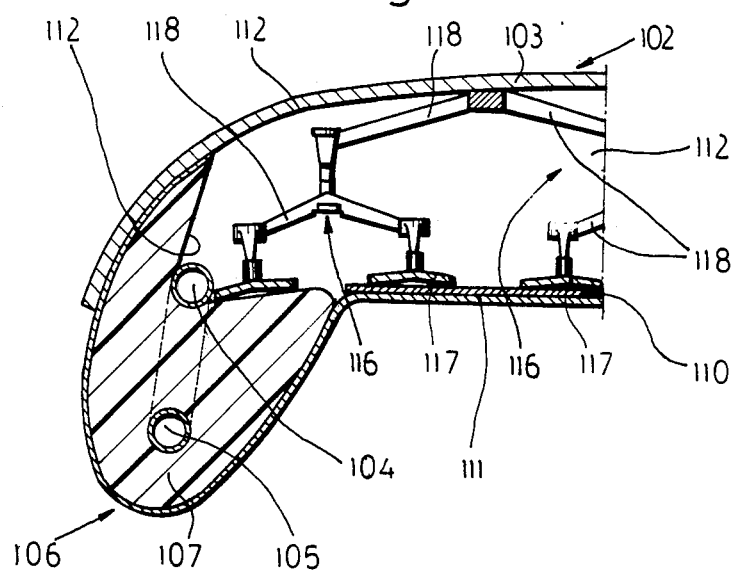
FIG. 4 is a partially illustrated cross section according to FIG. 3 of a second exemplary embodiment.

Referring now in detail to the drawings, there is illustrated in FIGS. 1 and 2 a vehicle seat having a seat element 1 which may be joined in a conventional manner to its back rest and therefore does not need to be described in detail. Seat element 1 has, as supporting elements, a the back rest 2, a shell 3 and longitudinal beams 4, which, together with beams 5 form respective side portions. The two longitudinal beams 4, as shown in FIGS. 1 and 3, run near respective side plates 6 at a distance from the shell 3, with which the upper and lower ends of said beams 4 are rigidly connected. One of the beams 5 is connected respectively to each of the longitudinal beams 4, which beams 5, together with the shell 3 and the longitudinal beams 4, provide the necessary support for an upholstery element 7 of the side plate. The shell 3, which in the exemplary embodiment is made of sheet metal, but can also be manufactured from plastic, supports a cover 8 on its rear side, which cover 8 is a covering material made from plastic. Of course, the cover 8 could also be made in a different manner or could be eliminated entirely if the shell 3 is itself made of plastic.

The lateral edge of a flat upholstery element 9 made from a webbing that is suitably permeable for heat and moisture, is attached to the two longitudinal beams 4, which extend over the entire length of the back rest. The flat upholstery, due to its construction and attachment, as well as the shape of the longitudinal beams 4, provides a proper anatomical shape. In order to achieve the functionally proper support to the seat user, the tension of the flat upholstery support can be selected to vary in different local areas thereof. Of course, a nonhomogenous construction of the flat upholstery could be considered for this purpose. To the extent that it is necessary to achieve the requisite tension in the flat upholstery element 9, the upholstery support can also have an upper and lower cross beam, which the upper and lower edges of the flat upholstery element 9 are connected. Furthermore, to achieve a different set of resiliency characteristics, the flat upholstery can be connected along its edge with the upholstery support by means of springs, instead of the direct connection illustrated in FIGS. 1 and 3.

As shown in FIGS. 1 and 3, the flat upholstery element 9 forms the upholstery for the central portion of the back rest lying between the two side plates 6. A mat layer 10 is placed on the front side of the flat upholstery element 9 facing the seat user. A cover layer 11 covers the mat layer 10 as well as the upholstery elements 7 of the two side plates and forms the support surface for the back of the seat user. The flat upholstery element 9, the mat layer 10 and the cover layer 11 thus form the wall, the outer side of which serves as the support surface.

If heating is necessary, heating wires can be integrated into the flat upholstery.

As shown in FIG. 3, the intermediate space between the flat upholstery element 9 and the shell 3, which is bounded in the area of the two side plates 6 by the upholstery elements 7 thereof, is open, thus forming a channel 12 for the passage of air. Recesses 13 and 14 (FIG. 2) on the upper and lower ends of the shell 3 or at the sides near to the upper and lower ends of the channel 12 make it possible in the exemplary embodiment for air to enter and exit the channel 12. Of course, it would also be possible to connect one or both ends of the channel 12 to at least one tube.

The air can be forced or aspirated through the channel 12. In the latter case, a fan blower can be placed at the lower recess 14, for example.

The limiting moisture passage resistance for the water vapor transport to the air flowing in the channel, at 1 m/s air flow speed, is 0.15 $m^2$ mbar/watt along the boundary surface of the channel 12. At this air speed the heat resistance has a value of 0.3 $m^2$ °K./watt. To achieve these values, a commonly used webbing of wool or mixture of wool and synthetic fibers was used with a mat layer 10 comprising a wool mat with a thickness of about 5 mm. However, even a thickness of up to 10 mm does not significantly detract from the vapor transfer. The flat upholstery element 9 does not materially contribute to these two resistance values. Furthermore, a skin temperature of 35° C., a relative humidity of the air near the skin of 95% and a vapor pressure at this location of 53.5 mbar were used as a basis for arriving at the following listed values. In addition, a contact surface between the back and the support surface of the back of the seat was assumed at 0.125 $m^2$, which at a heat transfer of 100 watt/$m^2$, leads to a heating capacity within the contact surface area of 12.5 watts. From these values it is shown that the heat quantity occurring in the contact surface can be completely transferred by means of a water vapor transfer into the air flowing in the channel, if the water vapor partial pressure in the channel is at 38.5 mbar. This partial pressure will prevail in the channel 12, for example, if the air temperature is 35° C. and the relative humidity is 68.3%, the air temperature is 40° C. and the relative humidity is 52.2% or the air temperature is 50° and the relative humidity is 31.2%. One sees from this that even at air temperatures above the skin temperature, a heat transfer is possible by means of the water vapor transfer, while at the present values, the heat occurring in the contact surface can only be completely removed into the channel with a dry heat conductor if the air temperature in the channel is no more than 5° C. At the temperature prevailing in the vehicle, at which a heat transfer is desired from the contact surface into the channel, there therefore occurs no or at least no significant dry heat transfer. If the relative humidity increases, however, to 55%, for example at an air temperature of 35° C., as a result of the water vapor absorbed by the air, then the water vapor partial pressure in the air rises from 28.1 mbar to 31 mbar, and 1.9 g of water are absorbed by every 1 kg of dry air. At an air density of 1.14 kg/m the resultant requisite air flow rate is 2.4 l/s. As long as the surrounding environment is not extremely unfavorable, one can therefore proceed on the assumption that an air quantity of 3 l/s to 10 l/s is sufficient to maintain the water vapor transfer at the proper level at normal air temperatures. If the pressure drop in the channel is 0.2 mbar and the air permeability of the wall is 10 l/$m^2$ s mbar, then the air quantity discharging from the contact surface is 0.25 l/s. This air quantity will generally not be noticed, or at least not be felt to be troublesome.

Figure 5:
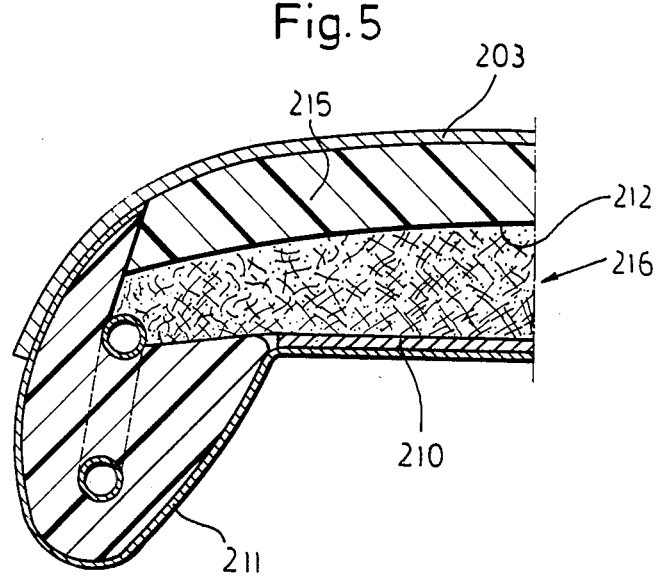
FIG. 5 is a partially illustrated cross section according to FIG. 4 of a third exemplary embodiment.

Similar values are obtained when an 8 mm thick layer of an open pore foam element, which can be connected by means of gluing or heat lamination with the cover material, is used in place of the mat layer 10. A foam layer of this type can also replace the mat layer mentioned in the exemplary embodiments described below As shown in FIGS. 4 and 5, the invention is not limited to embodiments in which the seat, as upholstery, has a flat upholstery element in the area of the air channel or channels. In the exemplary embodiment illustrated in FIG. 4, which, like the exemplary embodiment according to the FIGS. 1 through 3, has a shell 103, two longitudinal beams 104 and the beams 105 that with the longitudinal beams 104 form the side elements, as the supporting structure of a back rest 102, the shell 103 includes spacer elements 116 in the area between the upholstery elements 107 of the side plates 106. These spacer elements 116, which in the exemplary embodiment are made of plastic, have pressure distributing plates 117 on the side opposite the shell 103, against which a mat layer 110 rests, which itself forms the support for a cover material 111. As shown in FIG. 4, the pressure distributing plates 117 are supported against the shell 103 by means of cross members 118. Because these cross members 118 are elastically deformable and essentially are loaded to the point of bending under a pressure load on the support surface formed by the cover material 111, the spacer elements 116 fulfill the function of an upholstery element. The spacer elements could also be formed by a metal wire webbing having a low air resistance.

In consequence of the spacing of the mat layer 110 from the shell 103, a channel 112 is present between the two elements, which is approximately of the same dimensions as the channel 12, although the free space is reduced by the spacing elements 116. The cross members 118, which are primarily responsible for this reduction, can however, as shown in FIG. 4, be made so thin that the free cross section is still adequate to be able to pass through the required air quantity with a small pressure drop.

The mat layer 110 and the cover layer 111, which covers the mat layer 110 and the upholstery element 107 of the side plates, have a good moisture conductivity capability. This assures a good moisture transfer to the air flowing through the channel and a correspondingly good heat transfer. The pressure distributing plates 117 lying against the mat layer 110 can be provided with openings in order to not prevent moisture passage from occurring in the area of the pressure distributing plates 117.

The exemplary embodiment illustrated in FIG. 5 differs from that according to FIG. 4, first of all, in that a flexible, but shape-retaining synthetic fiber snarl is arranged in the channel 212 instead of the spacing element 116, and the mat layer 210 bordering the channel 212 toward the support surface rests thereon. The other difference is that the side of the channel 212 opposite the support surface is bordered by an upholstery element 215 of a common design, against which the synthetic fiber snarl 216 is supported and which rests against the shell 203. The flow resistance of the synthetic fiber snarl is so low that even in this exemplary embodiment, the excess pressure of the air in the channel 212 can be kept so low that no air passes through mat layer 110 and the cover 211, both of which having a good heat and moisture conducting capability.

If a blower fan is provided in order to permit the requisite air quantity through the channel, the blower fan can be built onto the seat, or, as shown in FIG. 6, can be integrated into the seat. Furthermore, in this exemplary embodiment heating unit 318 is arranged in the aspiration channel of the blower 317, so that when necessary, air at an elevated temperature can flow through the channels 312 provided in the seat portion and the back rest. The air quantity conveyed by the blower 317 is controlled by a regulating device 319 in dependence on the humidity measured at the support surface of the back rest by means of a humidity sensor 320. In addition, in the exemplary embodiment a heat sensor 321 is provided in the support surface of the back rest, and the measurement value thereof is taken into account by the regulating device 319 in controlling the rotational speed of the blower 317. The regulating device 319 also controls the heating unit 318. In a similar manner, the air quantity flowing through the channel in the above-described exemplary embodiments, and where desired even the temperature of this air, can be controlled. With regard to further details of the exemplary embodiment according to FIG. 6, reference is made to the above-described exemplary embodiments, because to that extent, the exemplary embodiment according to FIG. 6 can be formed like the above-described exemplary embodiments.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A vehicle seat having a back rest and support surface for supporting the vehicle user, in which at least one portion of the support surface facing the seat user forms at least the outside of a wall, the inner side of which wall borders at least one channel, through which air flows, wherein said wall is at least substantially impermeable to air at the pressure prevailing in the channel, and said wall comprises a material which, when there is a drop in the water vapor partial pressure from the outside to the air flowing through the channel, transfers water vapor in the direction of this partial pressure drop.

2. A vehicle seat having a back rest and support surface for supporting the vehicle user, in which at least one portion of the support surface facing the seat user forms at least the outside of a wall, the inner side of which wall borders at least one channel, through which air flows, wherein said wall is at least substantially impermeable to air at the pressure prevailing in the channel, and said wall comprises a material which, when there is a drop in the water vapor partial pressure from the outside to the air flowing through the channel, transfers water vapor in the direction of this partial pressure drop, wherein the moisture passage resistance of the material is less than 0.2 m$^2$ mbar/watt, and is preferably less than 0.15 m$^2$ mbar/watt.

3. The vehicle seat according to claim 2, wherein the moisture passage resistance of the material is less than 0.05 m$^2$ mbar/watt.

4. A vehicle seat having a back rest and support surface for supporting the vehicle user, in which at least one portion of the support surface facing the seat user forms at least the outside of a wall, the inner side of which wall borders at least one channel, through which air flows, wherein said wall is at least substantially impermeable to air at the pressure prevailing in the channel, and said wall comprises a material which, when there is a drop in the water vapor partial pressure from the outside to the air flowing through the channel, transfers water vapor in the direction of this partial pressure drop, wherein the air permeability of the material is less than 20 l/m$^2$ mbar, and is preferably less than 10 l/m$^2$ mbar.

5. The vehicle seat according to claim 4, wherein the air permeability of the material is less than 5 l/m$^2$ s mbar.

6. A vehicle seat having a back rest and support surface for supporting the vehicle user, in which at least one portion of the support surface facing the seat user forms at least the outside of a wall, the inner side of which wall borders at least one channel, through which air flows, wherein said wall is at least substantially impermeable to air at the pressure prevailing in the channel, and said wall comprises a material which, when there is a drop in the water vapor partial pressure from the outside to the air flowing through the channel, transfers water vapor in the direction of this partial pressure drop, wherein the heat conductivity resistance of the material is less than 0.3 m$^2$ °K./watt.

7. The vehicle seat according to claim 6, wherein the heat conductivity resistance of the material is less than 0.1 m$^2$ °K./watt.

8. A vehicle seat having a back rest and support surface for supporting the vehicle user, in which at least one portion of the support surface facing the seat user forms at least the outside of a wall, the inner side of which wall borders at least one channel, through which air flows, wherein said wall is at least substantially impermeable to air at the pressure prevailing in the channel, and said wall comprises a material which, when there is a drop in the water vapor partial pressure from the outside to the air flowing through the channel, transfers water vapor in the direction of this partial pressure drop, wherein the material forming the wall comprises at least two layers and the layer forming the support surface is formed by a textile upholstery covering material.

9. The vehicle seat according to claim 8, wherein the layer directly adjacent the upholstery covering material is formed by a mat, preferably a wool mat.

10. The vehicle seat according to claim 8, wherein the layer immediately adjacent the upholstery covering material is formed by a foam material which is preferably connected with the upholstery covering material by means of one of gluing and heat lamination.

11. The vehicle seat according to claim 8, wherein the layer forming the channel boundary wall is formed by a webbing.

12. The vehicle seat according to claim 11, wherein the webbing forms at least a portion of a flat upholstery element.

13. A vehicle seat having a back rest and support surface for supporting the vehicle user, in which at least one portion of the support surface facing the seat user forms at least the outside of a wall, the inner side of which wall borders at least one channel, through which air flows, wherein said wall is at least substantially impermeable to air at the pressure prevailing in the channel, and said wall comprises a material which, when there is a drop in the water vapor partial pressure from the outside to the air flowing through the channel, transfers water vapor in the direction of this partial pressure drop, wherein the material forming the wall is supported on at least one spacer element arranged in the channel.

14. The vehicle seat according to claim 12, wherein each spacer element is formed as a resilient element.

15. The vehicle seat according to claim 13, wherein the spacer element is formed by one of a flexible, pressure-stable synthetic fiber and metal wire webbing, each having low air resistance.

16. A vehicle seat having a back rest and support surface for supporting the vehicle user, in which at least one portion of the support surface facing the seat user forms at least the outside of a wall, the inner side of which wall borders at least one channel, through which air flows, wherein said wall is at least substantially impermeable to air at the pressure prevailing in the channel, and said wall comprises a material which, when there is a drop in the water vapor partial pressure from the outside to the air flowing through the channel, transfers water vapor in the direction of this partial pressure drop, wherein the channel is free of supports and spacer elements.

17. A vehicle seat having a back rest and support surface for supporting the vehicle user, in which at least one portion of the support surface facing the seat user forms at least the outside of a wall, the inner side of which wall borders at least one channel, through which air flows, wherein said wall is at least substantially impermeable to air at the pressure prevailing in the channel, and said wall comprises a material which, when there is a drop in the water vapor partial pressure from the outside to the air flowing through the channel, transfers water vapor in the direction of this partial pressure drop, having a regulating device which influences the air flow rate through the channel.

18. The vehicle seat according to claim 17, wherein the regulating device also influences the temperature of the air flowing through the channel.

19. A vehicle seat having a back rest and support surface for supporting the vehicle user, in which at least one portion of the support surface facing the seat user forms at least the outside of a wall, the inner side of which wall borders at least one channel, through which air flows, wherein said wall is at least substantially impermeable to air at the pressure prevailing in the channel, and said wall comprises a material which, when there is a drop in the water vapor partial pressure from the outside to the air flowing through the channel, transfers water vapor in the direction of this partial pressure drop, having a regulating device which influences the temperature of the air flowing through the channel.

20. The vehicle seat according to claim 17, wherein the regulating device has a moisture sensor.

21. The vehicle seat according to claim 18, wherein the regulating device also has a temperature sensor.

22. The vehicle seat according to claim 19, wherein the regulating device has a temperature sensor.

23. The vehicle seat according to claim 21, wherein the regulating device also has a moisture sensor.

* * * * *